United States Patent [19]
Mafune

[11] Patent Number: 6,163,667
[45] Date of Patent: Dec. 19, 2000

[54] SEMI-TRANSMISSIVE LIQUID CRYSTAL DISPLAY DEVICE FREE FROM REVERSAL OF DISPLAY ON SCREEN

[75] Inventor: Takahito Mafune, Fukushima-ken, Japan

[73] Assignee: Alps Electric Co., Ltd., Japan

[21] Appl. No.: 09/427,467

[22] Filed: Oct. 26, 1999

[30] Foreign Application Priority Data

Oct. 27, 1998 [JP] Japan .................................. 10-305977

[51] Int. Cl.⁷ .................................................. G02F 1/1335
[52] U.S. Cl. ............................................... 399/112; 349/96
[58] Field of Search ............................ 349/112, 99, 101, 349/117, 121, 96, 113

[56] References Cited

U.S. PATENT DOCUMENTS 3,995,949 12/1976 Maezawa .................................... 349/99
5,746,857 5/1998 Murata et al. ............................ 156/102

FOREIGN PATENT DOCUMENTS 10-239683 9/1998 Japan .

*Primary Examiner*—William L. Sikes
*Assistant Examiner*—Toan Ton
*Attorney, Agent, or Firm*—Brinks Hofer Gilson & Lione

[57] ABSTRACT

Disclosed is a liquid crystal display device free from display reversal on the screen and capable of being reduced in thickness. A liquid crystal display device of the type in which a transparent electrode and an orientation layer are sequentially formed on the inner side of each of a pair of transparent substrates opposed to each other through the intermediation of a liquid crystal layer and in which a pair of polarizing plates are opposed to each other through the intermediation of the transparent substrates and the liquid crystal layer, wherein a semi-transmissive scattering layer 25 is provided on the outer side of at least one of the pair of polarizing plates, wherein the angle $\theta_2$ made by the orientation layer 14 of the transparent substrate 4 arranged on the semi-transmissive scattering layer 25 side and the absorption axis of the polarizing plate 7 adjacent to the transparent substrate 4 is set to be 70 to 90 degrees, and wherein the angle $\theta_3$ made by the absorption axis of the polarizing plate 7 and the optical axis of the semi-transmissive scattering layer 25 is set to be −40 to −70 degrees.

4 Claims, 3 Drawing Sheets

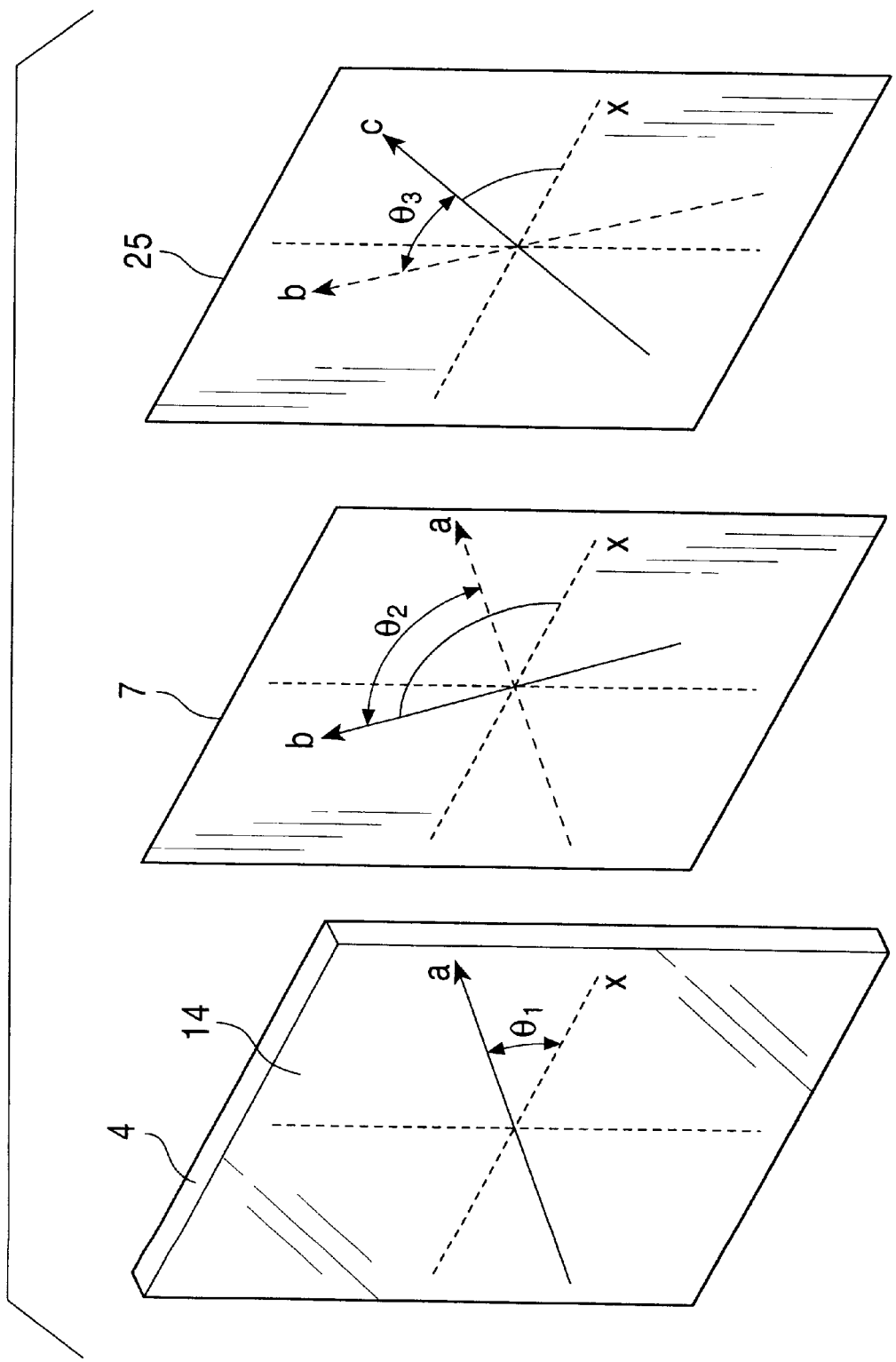

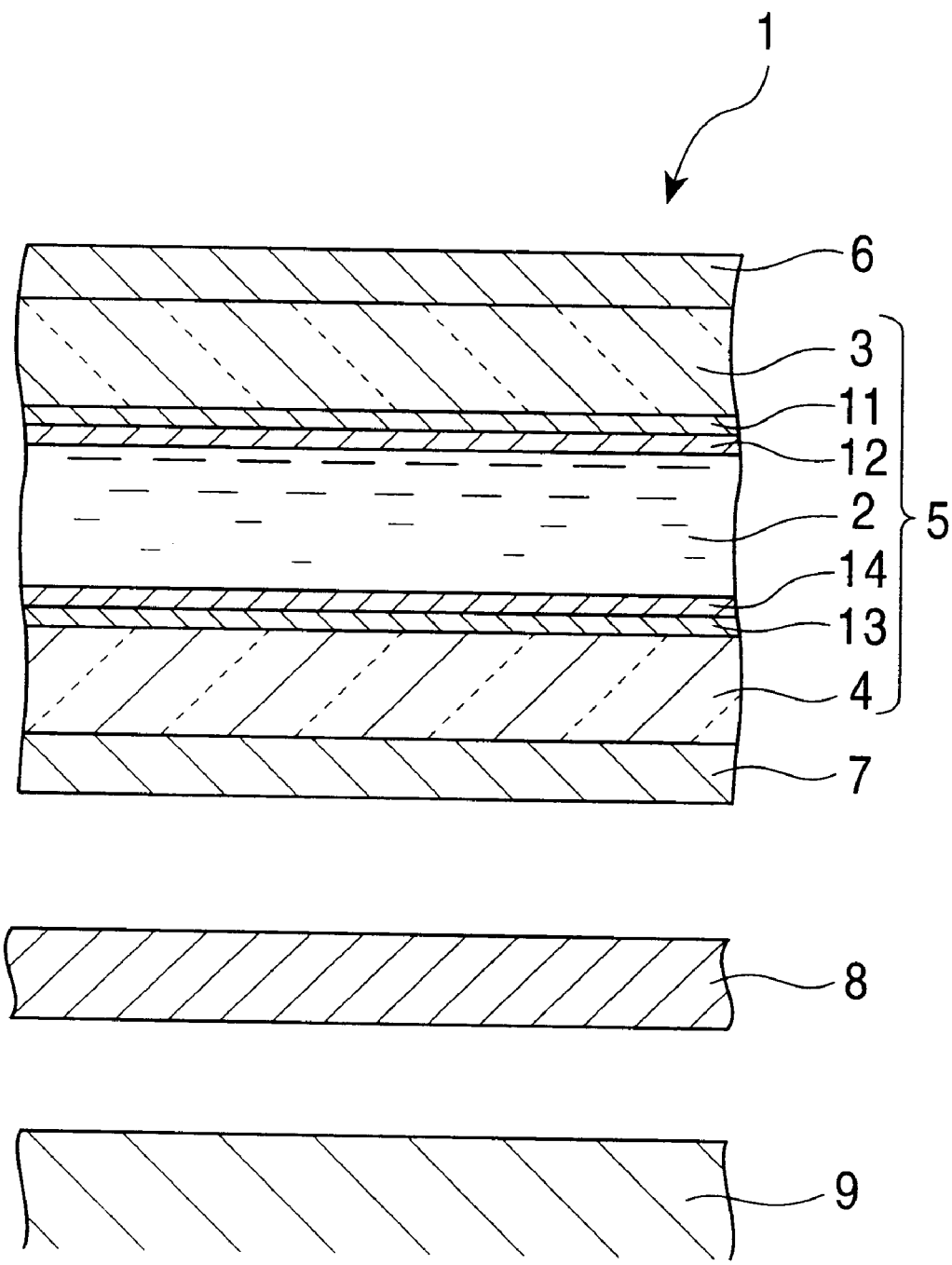

SEMI-TRANSMISSIVE LIQUID CRYSTAL DISPLAY DEVICE FREE FROM REVERSAL OF DISPLAY ON SCREEN

BACKGROUND OF THE INVENTION

1. Field of the Invention

The present invention relates to a liquid crystal display device and, in particular, to a liquid crystal display device suitable for use in an ECB type color liquid crystal display which effects multi-color display using ECB (electrically controlled birefringence) effect.

2. Description of the Related Art

Conventionally, there has been available, as an LCD (liquid crystal device) having a simple construction and capable of stable multi-color display, an ECB type color liquid crystal device, in which the birefringence of a liquid crystal cell is controlled by applying an electric field thereto.

This color liquid crystal display device effects color display by utilizing the birefringence effect provided by a liquid crystal cell using an STN (super-twisted nematic) molecular arrangement in which the dielectric anisotropy is positive (or negative) and in which the twisting angle is 180 to 360 degrees.

FIG. 3 is a sectional view showing an example of a conventional ECB type semi-transmissive liquid crystal display device.

In this semi-transmissive liquid crystal display device 1, an STN type liquid crystal cell 5 is formed by an STN liquid crystal layer 2, and upper and lower glass substrates 3 and 4 opposed to each other through the intermediation of the STN liquid crystal layer 2. An upper polarizing plate 6 is provided on the upper side of this liquid crystal cell 5, and a lower polarizing plate 7 is provided under it. A semi-transmissive plate 8 and a backlight 9 are provided below the lower polarizing plate 7.

On the lower side of the upper glass substrate 3, an upper transparent electrode 11 and an upper orientation layer 12 are stacked together, and on the upper side of the lower glass substrate 4, a lower transparent electrode 13 and a lower orientation layer 14 are stacked together. The STN liquid crystal layer 2 is sealed in the region defined by the upper orientation layer 12 and the lower orientation layer 14.

In this semi-transmissive liquid crystal display device 1, an attempt is made to use a semi-transmissive film instead of the semi-transmissive plate 8 to achieve a further reduction in thickness.

Unlike other types of liquid crystal display device, this semi-transmissive liquid crystal display device 1 uses no color filter, so that there is no deterioration in light transmittance and it is possible to make the screen bright, with the power consumption being reduced.

However, the above-described conventional semi-transmissive liquid crystal display device 1 has a problem in that if a semi-transmissive film is used instead of the semi-transmissive plate 8, the display is reversed when transmitted light from the backlight 9 is used (i.e., when the device is used as a transmission type liquid crystal display device) although the display when reflected light is used (i.e., when the device is used as a reflection type liquid crystal display device) is normal.

The reversal of the display in the case of transmitted light is a serious problem in the semi-transmissive liquid crystal display device 1, so that the semi-transmissive film has not taken the place of the semi-transmissive plate 8 yet.

SUMMARY OF THE INVENTION

The present invention has been made in view of the above problem. Accordingly, it is an object of the present invention to provide a liquid crystal display device which is free from reversal of display on the screen and which can be further reduced in thickness.

To achieve the above object, there is provided, in accordance with the present invention, a liquid crystal display device of the type in which a transparent electrode and an orientation layer are sequentially formed on the inner side of each of a pair of transparent substrates opposed to each other through the intermediation of a liquid crystal layer and in which a pair of polarizing plates are opposed to each other through the intermediation of the transparent substrates and the liquid crystal layer, wherein a semi-transmissive scattering layer is provided on the outer side of at least one of said pair of polarizing plates, wherein the angle made by the orientation layer of the transparent substrate arranged on the semi-transmissive scattering layer side and the absorption axis of the polarizing plate adjacent to the transparent substrate is set to be 70 to 90 degrees, and wherein the angle made by the absorption axis of the polarizing plate and the optical axis of the semi-transmissive scattering layer is set to be −40 to −70 degrees.

In the liquid crystal display device of the present invention, it is desirable for the transmissive scattering layer to consist of a high molecular film.

It is desirable for the high molecular film to be a multilayer film having a polyester type resin layer.

In the liquid crystal display device of the present invention, a semi-transmissive scattering layer is provided on the outer side of at least one of the pair of polarizing plates, the angle made by the orientation of the orientation layer of the transparent substrate arranged on the semi-transmissive scattering layer side and the absorption axis of the polarizing plate adjacent to the transparent substrate is set to be 70 to 90 degrees, and the angle made by the absorption axis of the polarizing plate and the optical axis of the semi-transmissive scattering layer is set to be −40 to −70 degrees, whereby the relative reflection luminance of the reflected light from the semi-transmissive scattering layer is improved, and the reversal of display due to the transmitted light is prevented. Due to this arrangement, there is no fear that removal of display on the screen will be generated, and it is possible to achieve a satisfactory display characteristic. Thus, the image quality of the semi-transmissive type liquid crystal is improved.

BRIEF DESCRIPTION OF THE DRAWINGS

FIG. 2 is an exploded perspective view showing an ECB type semi-tranissive type liquid crystal display device according to an embodiment of the present invention; and FIG. 3 is a sectional view showing an example of a conventional ECB type semi-transmissive type liquid crystal display device.

DESCRIPTION OF THE PREFERRED EMBODIMENT

Figure 1:
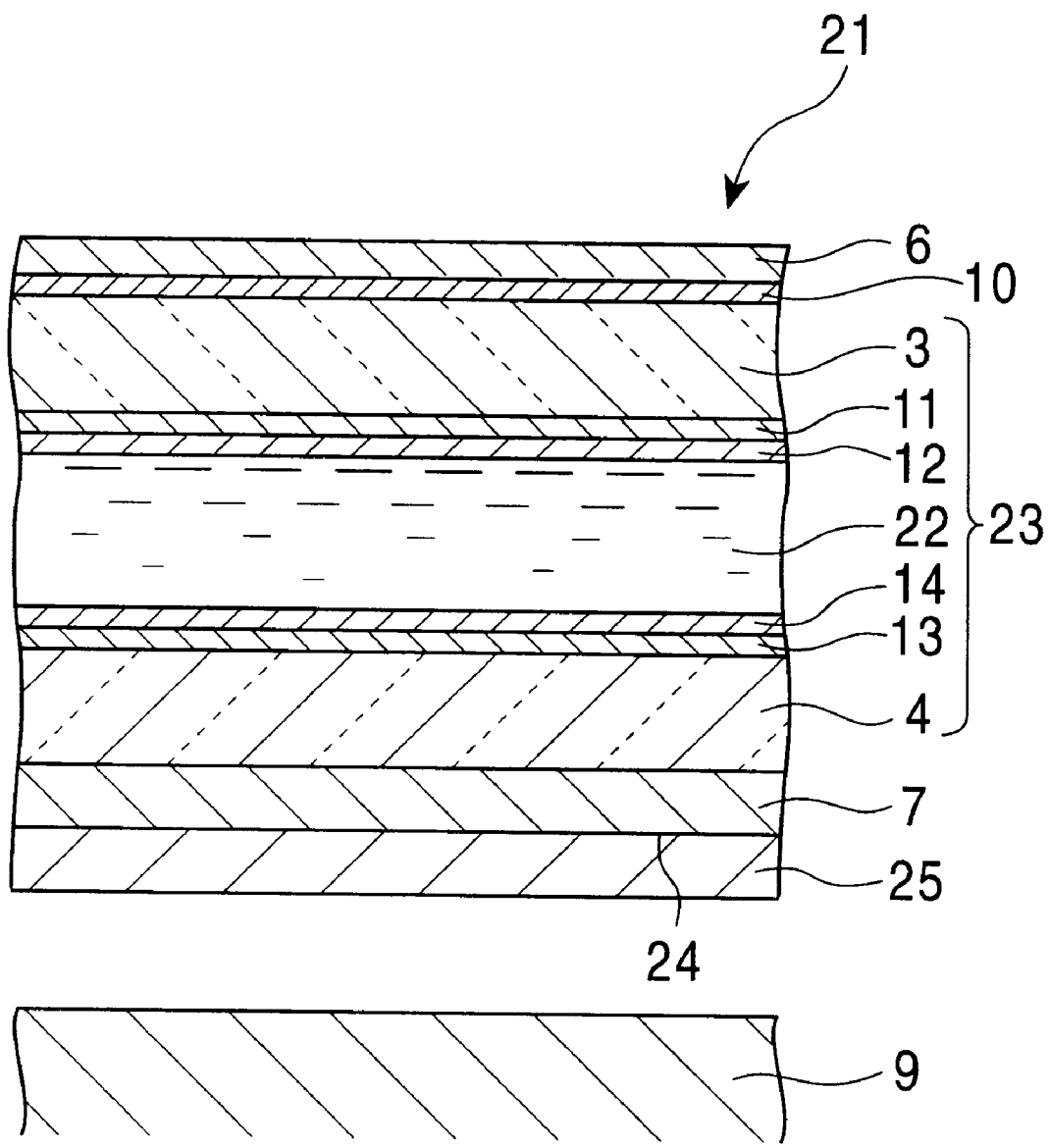
FIG. 1 is a sectional view showing an ECB type semi-transmissive type liquid crystal display device according to an embodiment of the present invention.

A liquid crystal device according to an embodiment of the present invention will be described with reference to the drawings.

FIG. 1 is a sectional view showing an ECB type semi-transmissive type liquid crystal display device according to an embodiment of the present invention. The components which are the same as those of the conventional semi-transmissive liquid crystal display device are indicated by the same reference numerals.

In this semi-transmissive liquid crystal display device 21, an STN type liquid crystal cell 23 is formed by an STN liquid crystal layer 22 and upper and lower glass substrates 3 and 4 opposed to each other through the intermediation of the STN liquid crystal layer 22. An upper polarizing plate 6 is provided on the upper surface of the liquid crystal cell 23, and a lower polarizing plate 7 is provided on the lower surface thereof. On the lower surface of the lower polarizing plate 7, there is provided a semi-transmissive scattering layer 25 through the intermediation of a diffusion type adhesive layer 24, etc., and a backlight 9 is provided below the semi-transmissive scattering layer 25. Further, between the upper glass substrate 3 and the upper polarizing plate 6, there is provided a phase plate 10.

The STN liquid crystal layer 22 consists of STN (super-twisted nematic) liquid crystal molecules which exhibit positive dielectric anisotropy at room temperature and which has a twist angle of 180 to 360 degrees and, more preferably, 180 to 270 degrees. This STN liquid crystal layer 22 is sealed in the region defined between the upper orientation layer 12 and the lower orientation layer 14.

The semi-transmissive scattering layer 25 consists of a high molecular film which scatters light of a specific wavelength and transmits light of the other wavelengths, for example, a multi-layer film having a polyester type resin layer. A semi-transmissive and reflection type high molecular film such as RDF-C (trade name) manufactured by Sumitomo 3M is suitably applicable.

The diffusion type adhesive 24 is applied to the side of this RDF-C which is glued. Since this diffusion type adhesive 24 is covered with a PET film for separation, this PET film is separated when used and the diffusion type adhesive 24 is glued to the lower side of the lower polarizing plate 7.

The upper glass substrate 3 and the lower glass substrate 4 differ depending upon the kind of liquid crystal display device. Soda-lime glass, whose alkali content is relatively small and which is superior in flatness is suitably applicable. Further, the thickness of these glass substrates 3 and 4 is often determined by the display area and the user specifications, so that it differs depending upon the kind of liquid crystal display device. In this example, it is 0.3 to 1.1 mm.

The upper polarizing plate 6 and the lower polarizing plate 7 are prepared by adding a two-color dye or the like to a material such as PVA (polyvinylalcohol) and forming it into a film through uniaxial orientation. It exhibits a polarization characteristic in which the orthogonal transmittance with respect to a wavelength of 400 to 500 nm is 2% or less.

The upper orientation layer 12 and the lower orientation layer 14 consist of ordinary transparent orientation layers. A suitable example is a high molecular film of polyimide or the like which has undergone rubbing processing.

Next, the polarization relationship of this semi-transmissive liquid crystal display device 21 will be described with reference to FIG. 2.

FIG. 2 is an exploded perspective view showing the lower glass substrate 4, the semi-transmissive scattering layer 25, etc., which constitute a part of the semi-transmissive liquid crystal display device 21. The angle $\theta_1$ of the orientation (rubbing axis direction) a of the lower orientation layer 14 provided on the lower glass substrate 4 with respect to the horizontal axis X is set to be +30 degrees with respect to the horizontal axis X when the counterclockwise direction as seen from the light incident side (the left-hand side in the drawing) is + and the clockwise direction is −.

The angle $\theta_2$ of the polarization axis b of the lower polarizing plate 7 with respect to the orientation direction a of the lower orientation layer 14 is set to be +80±10 degrees, that is, 30 90 to +70 degrees. For example, when the orientation direction a of the lower orientation layer 14 is set to be +30 degrees with respect to the horizontal axis X, the polarization axis b of the lower polarizing plate 7 is set to be +110±10 degrees, that is, +120 to +100 degrees. When the angle of this polarization axis b is not set to the above-mentioned range, it is difficult to attain high contrast, or the display is reversed, so that it is impossible to obtain a satisfactory display characteristic.

The angle $\theta_3$ of the polarization axis c of the semi-transmissive scattering layer 25 with respect to the polarization axis b of the lower polarizing plate 7 is set to be −55±15 degrees, that is, −40 to −70 degrees. For example, when the polarization axis b of the polarizing plate 7 is set to be +110 degrees with respect to the horizontal axis X, the polarization axis c of the semi-transmissive scattering layer c is set to be +55±15 degrees with respect to the horizontal axis X, that is, +70 to +40 degrees with respect to the horizontal axis X. When the angle of this polarization axis C is not set in the above-mentioned range, it is difficult to attain high contrast, or the display is reversed, so that it is impossible to achieve a satisfactory display characteristic.

In the lower glass substrate 4 to the semi-transmissive scattering layer 25, the angle of the axis is appropriately adjusted within the range in which no reversal of the display occurs, whereby it is possible to control transmission-rich or reflection-rich state.

As described above, in the semi-transmissive liquid crystal display device 21, the upper polarizing plate 6 and the lower polarizing plate 7 are opposed to each other through the intermediation of the upper glass substrate 3, the lower glass substrate 4 and the STN liquid crystal layer 22, and the semi-transmissive scattering layer 25 is provided on the lower side of the lower polarizing plate 7, so that, by adjusting the axial angles of the two polarizing plates 6 and 7, the lower orientation layer 14, and the semi-transmissive scattering layer 25, it is possible to improve the relative reflection luminance of the reflected light from the semi-transmissive scattering layer 25, and to prevent the reversal of the light from the backlight 9. Thus, it is possible to achieve a satisfactory display characteristic free from reversal, and to improve the image quality of the semi-transmissive liquid crystal.

Further, since the semi-transmissive scattering layer 25 is provided on the lower surface of the lower polarizing plate 7, it is possible to reduce the thickness of the entire device, and to realize a thin semi-transmissive type liquid crystal display device.

While an embodiment of the semi-transmissive liquid crystal display device of the present invention has been described with reference the drawings, the present invention is not restricted to the above-described embodiment. It is possible to modify the design, etc. without departing from the scope of the gist of the present invention. For example, it is possible disperse in the semi-transmissive scattering layer 25 transparent particles differing in refractive index and serving as cores for scattering light of a specific wavelength, effecting uniform irregular reflection of the incident light of a specific wavelength.

Further, while a color semi-transmissive liquid crystal display device has been described, it goes without saying that the present invention is also applicable to a monochrome semi-transmissive liquid crystal display device.

As described above, in the liquid crystal display device of the present invention, a semi-transmissive scattering layer is provided on the outer side of at least one of the pair of polarizing plates, the angle made by the orientation layer of the transparent substrate arranged on the semi-transmissive scattering layer side and the absorption axis of the polarizing plate adjacent to the transparent substrate is set to be 70 to 90 degrees, and the angle made by the absorption axis of the polarizing plate and the optical axis of the semi-transmissive scattering layer is set to be −40 to −70 degrees, whereby it is possible to improve the relative reflection luminance of the reflected light from the semi-transmissive scattering layer and to prevent reversal of the display by the transmitted light. Thus, it is possible to prevent reversal of display on the screen and to obtain a satisfactory display characteristic free from reversal, with the result that it is possible to improve the image quality of the semi-transmissive liquid crystal.

Further, since the semi-transmissive scattering layer is provided on the outer side of the polarizing plate, it is possible to reduce the thickness of the entire device, and to realize a thin liquid crystal display device.

What is claimed is:

1. An ECB type color liquid crystal display device for one of a reflection-type and transmission-type liquid crystal display, said ECB type color liquid crystal display comprising:

a transparent electrode and an orientation layer sequentially formed on an inner side of each of a pair of transparent substrates opposed to each other through an STN type liquid crystal layer, and a pair of polarizing plates opposed to each other through the transparent substrates and the liquid crystal layer;

a semi-transmissive scattering layer provided on an outer side of at least one of said pair of polarizing plates, said semi-transmissive scattering layer disposed on a back surface side of at least one of said pair of polarizing plates, the back surface side being an opposite side of a display surface side; and a backlight provided on a back surface side of the semi-transmissive scattering layer, wherein an angle made by the orientation layer of the transparent substrate arranged on the semi-transmissive scattering layer side and an absorption axis of the polarizing plate adjacent to the transparent substrate is about 70 to 90 degrees, and wherein an angle made by the absorption axis of the polarizing plate and an optical axis of the semi-transmissive scattering layer is about −40 to −70 degrees.

2. A liquid crystal display device according to claim 1, wherein said semi-transmissive scattering layer consists of a high molecular film.

3. A liquid crystal display device according to claim 2, wherein said high molecular film is a multi-layer film having a polyester type resin layer.

4. An ECB type color liquid crystal display device according to claim 1, wherein a twist angle of said STN type liquid crystal layer is about 180 to 270 degrees.

* * * * *

UNITED STATES PATENT AND TRADEMARK OFFICE
CERTIFICATE OF CORRECTION

PATENT NO. : 6,163,667
DATED : December 19, 2000
INVENTOR(S) : Takahito Mafune

Page 1 of 1

It is certified that error appears in the above-identified patent and that said Letters Patent is hereby corrected as shown below:

<u>Title page,</u>
Item [54], delete "SEMI-TRANSMISSIVE LIQUID CRYSTAL DISPLAY DEVICE FREE FROM REVERSAL OF DISPLAY ON SCREEN" and insert -- ECB TYPE COLOR LIQUID CRYSTAL DISPLAY DEVICE SERVING AS BOTH REFLECTION TYPE AND TRANSMISSION TYPE DEVICE --.

Signed and Sealed this

Sixteenth Day of April, 2002

Attest:

JAMES E. ROGAN
*Director of the United States Patent and Trademark Office*

*Attesting Officer*